(12) United States Patent
Shinagawa

(10) Patent No.: US 6,418,660 B1
(45) Date of Patent: Jul. 16, 2002

(54) FLY LINE

(75) Inventor: Hiroshi Shinagawa, Tokyo (JP)

(73) Assignee: Kiro World Co., Ltd., Kyoto (JP)

( * ) Notice: Subject to any disclaimer, the term of this patent is extended or adjusted under 35 U.S.C. 154(b) by 0 days.

(21) Appl. No.: 09/614,697

(22) Filed: Jul. 12, 2000

(30) Foreign Application Priority Data

Jan. 19, 2000 (JP) ........................................ 2000-010659

(51) Int. Cl.[7] .............................................. A01K 91/12
(52) U.S. Cl. ...................................................... 43/44.98
(58) Field of Search ........................................ 43/44.98

(56) References Cited

U.S. PATENT DOCUMENTS

| | | | | | |
|---|---|---|---|---|---|
| 1,842,169 A | * | 1/1932 | Heddon | ...................... | 43/44.98 |
| 1,914,174 A | * | 6/1933 | Smith | ........................ | 43/44.98 |
| 1,927,581 A | * | 9/1933 | Bekeart | ...................... | 43/44.98 |
| 2,250,832 A | * | 7/1941 | Hedge | ........................ | 43/44.98 |
| 2,370,112 A | * | 2/1945 | Truitt | .......................... | 43/44.98 |
| 2,774,173 A | * | 12/1956 | Thienemann | ............... | 43/44.98 |
| 2,862,282 A | * | 12/1958 | Beebe | ........................ | 43/44.98 |
| 3,464,140 A | * | 9/1969 | Carabasse | .................. | 43/44.98 |
| 3,653,143 A | * | 4/1972 | Martuch et al. | ........... | 43/44.98 |
| 3,820,271 A | * | 6/1974 | Martuch et al. | ........... | 43/44.98 |
| 3,841,015 A | * | 10/1974 | Gregory | .................... | 43/44.98 |
| 4,048,744 A | * | 9/1977 | Chandler | .................... | 43/44.98 |
| 4,524,540 A | * | 6/1985 | Wulff | ........................ | 43/44.98 |

FOREIGN PATENT DOCUMENTS

GB          2151121 B1 *   7/1985

* cited by examiner

*Primary Examiner*—Darren W. Ark
(74) *Attorney, Agent, or Firm*—Sughrue Mion, PLLC

(57) ABSTRACT

The length of a non-tapered portion formed between tapered portions of a weight portion formed along a fly line is made to be sufficiently shorter than the front tapered portion and back tapered portion thereof, thus forming this non-tapered portion as the center of gravity, and thereby facilitating ease of selecting the casting distance of the line.

4 Claims, 6 Drawing Sheets

FLY LINE

BACKGROUND OF THE INVENTION

1. Field of the Invention

The present invention relates to a fly line, and particularly relates to new improvements wherein the length of a non-tapered portion formed between tapered portions of a weight portion formed partway along the line is made to be sufficiently shorter than the tapered portions thereof, whereby the center of gravity of the weight portion is formed at this non-tapered portion, thereby facilitating ease of selecting the casting distance of the line.

2. Description of the Related Art

Examples of such conventionally-used fly lines are shown in FIGS. 1 through 5.

Denoted by reference number 1 in FIG. 1 is a longitudinally shaped fly line with an overall length of 27 m for example, and the line 1a of this fly line 1 is configured of a core line 2 formed of mesh in a cylindrical fashion (or solid in cases), a coating 3 formed of PVC or the like coated on the perimeter of this core line 2, and so forth, as shown in the cross-sectional view in FIG. 9.

The task for forming the coating 3 is performed by passing the core line 2 through a guide hole (not shown) in a vat of PVC or the like, such that the thickness of the coating 3 can be changed by making the diameter of the guide hole to be variable.

As described above, a large diameter portion 4 serving as a weight portion formed with a greater diameter than the other portions is formed by the coating 3, as shown in FIG. 1. This large diameter portion 4 is made up of a front tapered portion 6 which is formed from the tip 5 side of the line 1a, a non-tapered portion 7 of a uniform diameter which serves as the belly portion formed continuously from this front tapered portion 6, and a back tapered portion 8 formed continuously from this belly portion 7, with a running line 9 being formed continuously from this back tapered portion 8.

The length of the non-tapered portion 7 in the axial direction at the large diameter portion 4, i.e. at the weight portion, is formed much longer than the length of either the front tapered portion 6 or the back tapered portion 8 in the axial direction, and the length of the non-tapered portion 7 in the axial direction is 10 times or more the length of the tapered portions 6 and 8, so the length of the tapered portions 6 and 8 as to the length of the non-tapered portion 7 is practically negligible.

Also, though the length of the non-tapered portion 7 is omitted in the other conventional embodiments shown in FIGS. 2 through 5, the configuration is such that the length of the non-tapered portion 7 is sufficiently longer than the tapered portions 6 and 8.

The above configuration of conventional fly lines has given rise to the following problems.

That is, the above-described fly line has a length of around 27 m to 32 m, though the length thereof differs according to the object of use, and is mounted on a fly fishing rod by means of a reel. Casting the fly line at a horizontal point causes the fly line to fly assuming a generally J-shaped form, following which the fly line assumes a straight line form and attains a turn state.

A fly attached to the tip of this fly line reaches the certain point in this turn state, whereby the user begins fishing.

However, the length of the non-tapered portion 7 comprising the weight portion 4 is sufficiently longer than the tapered portions, so it is difficult to set the position of the center of gravity as to the overall weight portion 4, and for example, there is the need to have this center of gravity positioned toward the rear in the event of casting to a near point and to have the center of gravity positioned forwards for casting to a distant point, but such differentiation has been extremely difficult.

SUMMARY OF THE INVENTION

The present invention has been made in order to solve the above problems, and accordingly, it is an object thereof to provide a fly line wherein the length of the non-tapered portion formed between the tapered portions of the weight portion formed partway along the line is made to be sufficiently shorter than the tapered portions, so that the center of gravity of the weight portion is formed at this non-tapered portion, thus facilitating ease of selecting the casting distance of the line.

The fly line according to the present invention has a front tapered portion and a back tapered portion for forming a large diameter portion on a longitudinally bendable line, which is tapered and of a diameter greater than other portions, and also has a non-tapered portion of a uniform diameter formed between the front tapered portion and the back tapered portion, wherein the length of the non-tapered portion is shorter than the length of the front tapered portion and the back tapered portion. The length of the non-tapered portion may be between 50 cm and 100 cm, and the non-tapered portion forms the center of gravity in the weight portion comprising the large diameter portion made up of the front tapered portion, non-tapered portion, and back tapered portion.

DETAILED DESCRIPTION OF THE PREFERRED EMBODIMENTS

Figure 1:
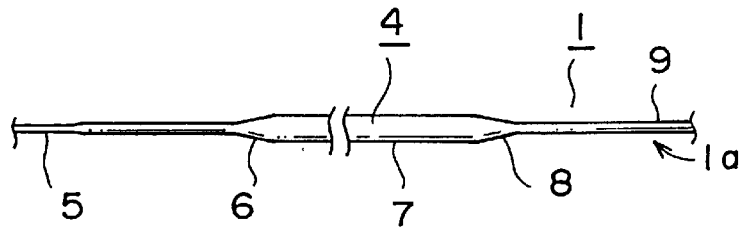
FIG. 1 is a configuration diagram illustrating a conventional fly line.
Figure 2:
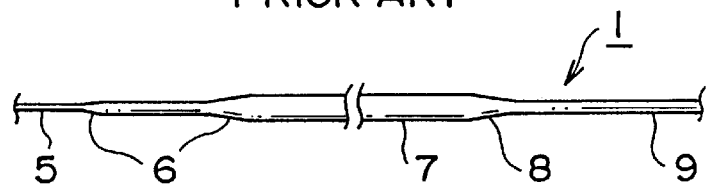
FIGS. 2 through 5 are configuration diagrams illustrating other conventional examples of that shown in FIG. 1.
Figure 3:
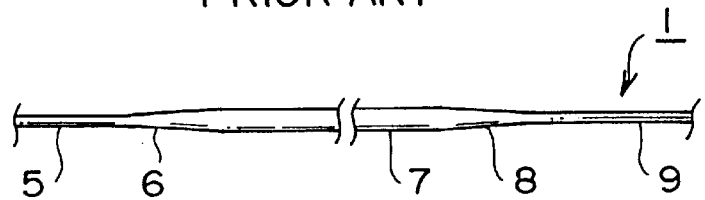
Figure 4:
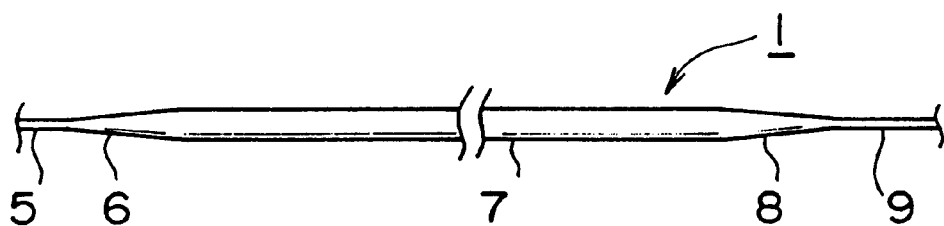
Figure 5:
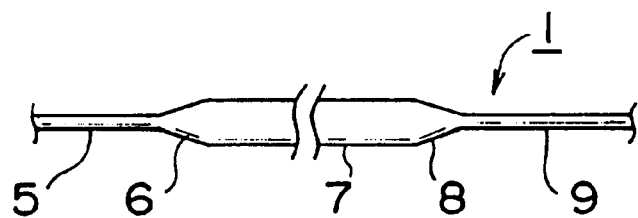

The following is a description of the preferred embodiments of the fly line according to the present invention, with reference to the drawings. The portions which are the same as those in the conventional examples will be denoted with the same reference numerals as the conventional examples.

Figure 6:
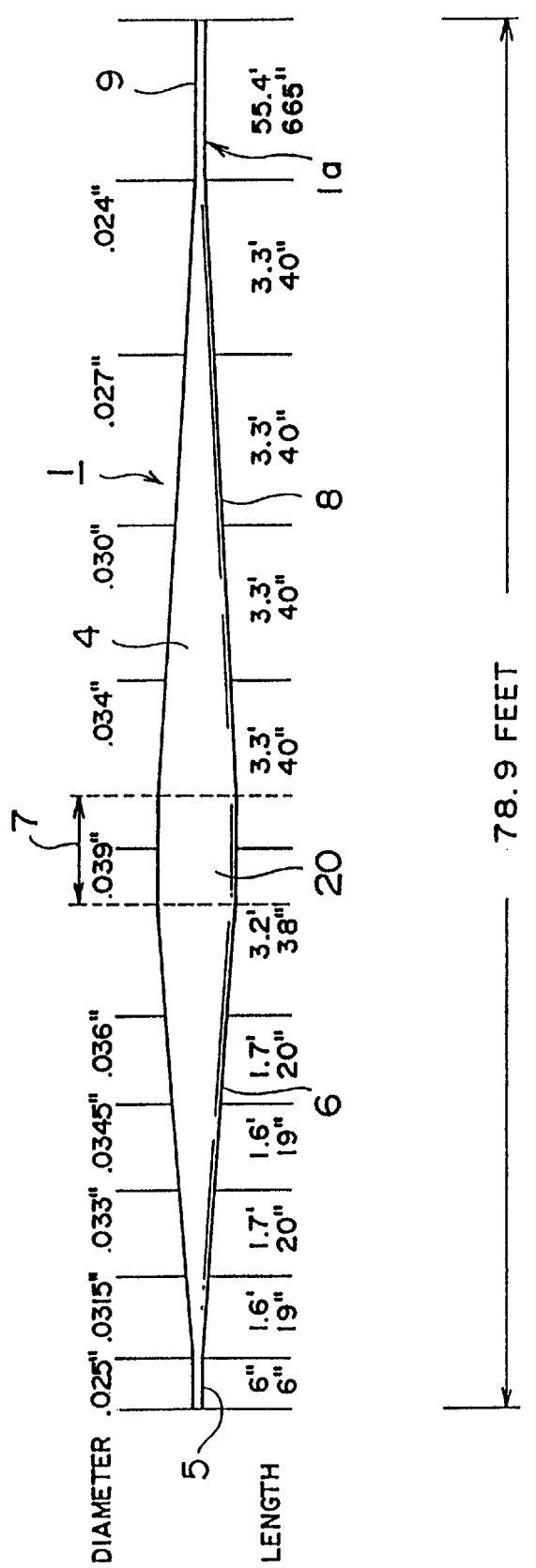
FIG. 6 is an enlarged diagram of the principal portions of the fly line according to the present invention.
Figure 9:
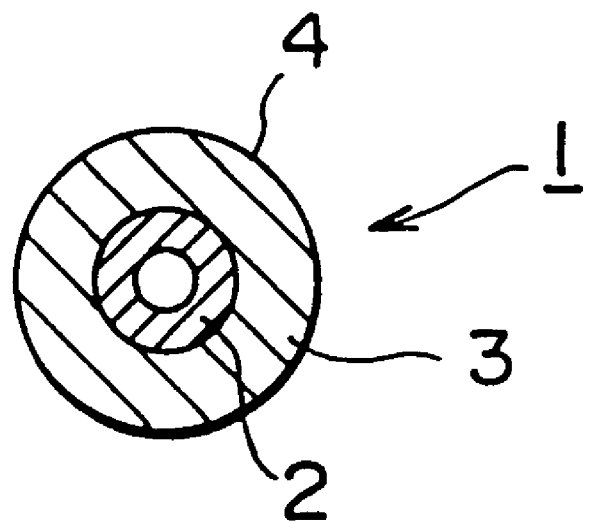
FIG. 9 is an enlarged cross-sectional diagram of that shown in FIG. 1.

In FIG. 6, reference numeral 1 denotes a longitudinally shaped fly line configured to an overall length of 27 m, and the line 1a of this fly line 1 is configured of a core line 2 formed of mesh in a cylindrical fashion (or solid in cases), and a coating 3 formed of PVC or the like coated on the perimeter of this core line 2, as shown in the cross-sectional view in FIG. 9.

The task for forming the coating 3 is performed by passing the core line 2 through a guide hole (not shown) in a vat of PVC or the like, such that the thickness of the coating 3 can be changed by making the diameter of the guide hole to be variable.

Figure 7:
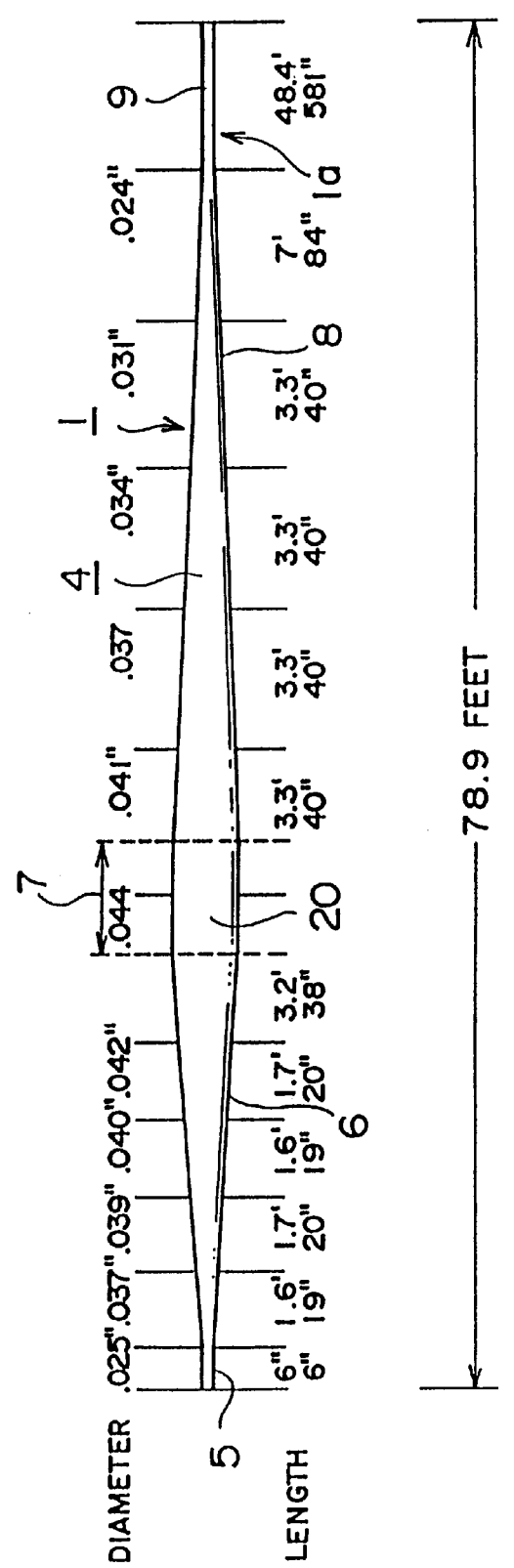
FIG. 7 is a configuration diagram of another embodiment of that shown in FIG. 6.
Figure 8:
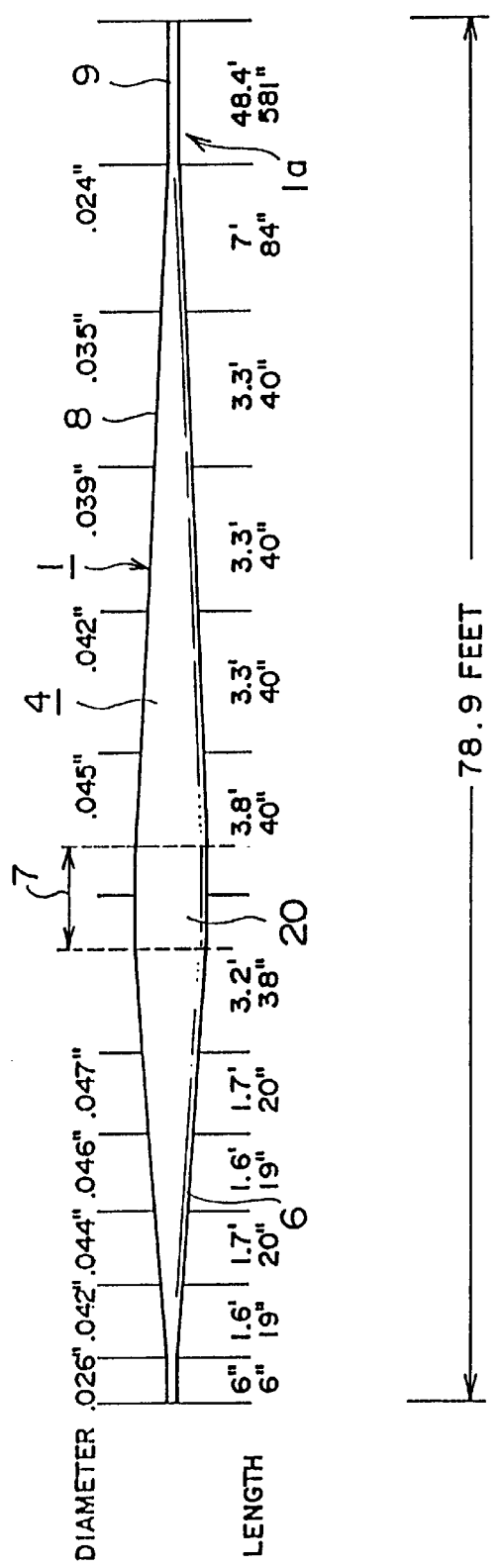
FIG. 8 is a configuration diagram of a further embodiment of that shown in FIG. 6.

Accordingly, following the formation of the front tapered portion 6, starting to close the diameter of the guide hole to form the back tapered portion 8 should theoretically form the border between the tapered portions 6 and 8 as a point with no length in the axial direction, but in practice, the core line 2 is being fed and is running at a predetermined speed, so a non-tapered portion 7 having a uniform diameter is formed over a length range of around 50 cm to 100 cm, which is a minute length in the axial direction, as shown in FIGS. 6 through 8.

Formed at the forward side of the non-tapered portion 7 is the front tapered portion 6 which continues from the tip 5, and formed at the rear side of the non-tapered portion 7 is the back tapered portion 8 which has the running line 9, while this non-tapered portion 7 comprises the center of gravity 20 of the weight portion 4 which is the large diameter portion.

Regarding the position for setting the center of gravity 20 formed of this non-tapered portion 7, the center of gravity 20 is set toward the forward side as shown in FIG. 7 in the event of casting the line 1a long distances, FIGS. 6 and 8 are arrangements for medium distances, and the center of gravity 20 is set on the side of the running line in the event of casting the line 1a short distances.

Accordingly, forming the axial direction length of the non-tapered portion 7 so as to be sufficiently shorter than the axial direction length of the tapered portions 6 and 8 (e.g., 1/10 or shorter), the setting of the center of gravity 20 becomes extremely easy. Note that the position for setting this center of gravity 20 can be freely selected, and can be set at arbitrary positions.

The fly line according to the present invention is configured as described above, and thus has the following advantages. That is, the lengths of the tapered portions at the weight portion formed of a large diameter portion are made to be sufficiently longer than the length of the non-tapered portion, so the center of gravity can be formed of this non-tapered portion, and the use of the fly line can be easily differentiated for near or far casting points by the position of this center of gravity, so ease of selling fly lines according to the object of use thereof is facilitated.

What is claimed is:

1. A fly line comprising:
   a non-tapered portion having a uniform diameter;
   a first tapered portion contiguous with a first end of said non-tapered portion, said first tapered portion tapering away from said non-tapered portion along an entire length of said first tapered portion; and
   a second tapered portion contiguous with a second end of said non-tapered portion, said second tapered portion tapering away from said non-tapered portion along an entire length of said second tapered portion,
   wherein the length of said non-tapered portion is between 50 cm and 100 cm and is also shorter than the respective lengths of said first tapered portion and said second tapered portion.

2. A fly line according to claim 1, wherein said non-tapered portion forms the center of gravity of said first tapered portion, said non-tapered portion, and said second tapered portion.

3. A fly line comprising:
   a longitudinally bendable line; and
   a large diameter portion on said longitudinally bendable line, said large diameter portion of a diameter that is greater than respective diameters of other portions of said longitudinally bendable line, said large diameter portion having a non-tapered portion of a uniform diameter formed between a front tapered portion and a back tapered portion, said front tapered portion tapering away from said non-tapered portion along an entire length of said front tapered portion, said back tapered portion tapering away from said non-tapered portion along an entire length of said back tapered portion,
   wherein the length of said non-tapered portion is between 50 cm and 100 cm and is also shorter than the respective lengths of said front tapered portion and said back tapered portion.

4. A fly line according to claim 3, wherein said non-tapered portion forms the center of gravity of said large diameter portion made up of said front tapered portion, said non-tapered portion, and said back tapered portion.

* * * * *